United States Patent [19]

McCrory

[11] 4,023,070

[45] May 10, 1977

[54] ELECTRICAL CIRCUIT FOR AUDIO SERVICES

[76] Inventor: Charles Francis McCrory, 6 E. Wickham St., Roker, Sunderland SR6 0EH, England

[22] Filed: Apr. 7, 1975

[21] Appl. No.: 565,640

[52] U.S. Cl. .................................. 361/43; 307/326
[51] Int. Cl.² ......................................... H02H 9/04
[58] Field of Search ...................... 317/9 R, 10, 11; 307/92–94; 174/5; 128/2.1 R, 2.1 A; 330/185, 188–190; 333/17, 17 R, 17 L, 17 M; 84/1.16, DIG. 9; 323/6, 44 R, 48

[56] References Cited

UNITED STATES PATENTS

| | | | |
|---|---|---|---|
| 3,192,491 | 6/1965 | Hesselberth et al. | 333/17 |
| 3,402,372 | 9/1968 | Wasyluk | 333/70 CR |
| 3,611,053 | 10/1971 | Rowell | 317/123 |
| 3,862,411 | 1/1975 | Persson | 174/5 R X |

OTHER PUBLICATIONS

"Electrical Interference," by Rocco F. Ficchi, Hayden Book Company, Inc., New York, 1964, pp. 98–101.

*Primary Examiner*—Harry Moose
*Attorney, Agent, or Firm*—Edward B. Gregg; J. Michael Rosso

[57] ABSTRACT

A mains safety isolating device is provided for an audio device e.g. guitar and microphone for preventing fatal electrical shock upon grounding breakdown and in which a transformer has a primary winding grounded at a point and connected to an electro-acoustic transducer to receive electrical signals therefrom, a secondary winding of said transformer is connected to a primary winding of a second transformer by signal conductors, a secondary winding of said second transformer being connected to the amplifier circuit of a mains powered amplifying and loudspeaker apparatus, said secondary winding being grounded at a second point separate and isolated from the first-mentioned point.

4 Claims, 1 Drawing Figure

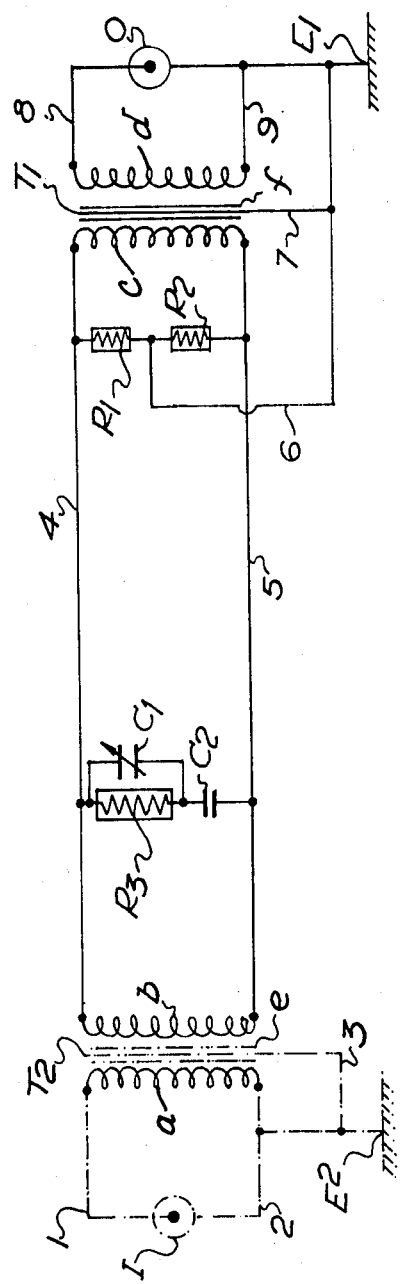

ELECTRICAL CIRCUIT FOR AUDIO SERVICES

This invention relates to a mains safety isolating device including an electrical circuit for electro-acoustic transducers such as microphones or electric guitars, for producing electrical signals, and connected to mains powered apparatus comprising amplifier and loudspeaker circuits.

The mains powered amplifier circuitry is usually connected to a housing of the apparatus which is normally grounded, but if a fault develops and the housing becomes live due to isolation from ground, the wiring to the electro-acoustic transducer such as an electric guitar, may also become live, and this has occasionally caused the fatal electrocution of performers.

An object of the invention is to provide an electrical circuit for the electro-acoustic transducer which minimizes the risk of the wiring connected to the electro-acoustic transducer becoming charged with a dangerous level of electrical current. The drawing is a schematic diagram of the present invention.

According to the invention, a mains safety isolating device comprises a first transformer, a primary winding of which is connected to ground at a first point and connected to an electro-acoustic transducer to receive electrical signals therefrom, and a secondary winding of which is connected to a primary winding of a second transformer by signal conductors, a secondary winding of the second transformer being connected to the amplifier circuit of a mains powered amplifying and loudspeaker apparatus, said secondary winding being connected to ground at a second point separate and isolated from the said first point.

A conductor connected to the core of the first transformer may also be connected to ground at said first point.

The primary winding of the second transformer preferably has an impedance matching that of the secondary winding of the first transformer. The impedances of the primary winding of the second transformer and the secondary winding of the first transformer are usually of a lower order than those of the other windings of the transformer.

A potential divider, preferably balanced, may be connected across the signal conductors with a center tap connected to ground and the core of the second transformer may also be connected to ground. These further earth connections may be made by way of the earth connection of the secondary winding of the second transformer.

An interference rejection circuit, for example a resistor connected in parallel with a variable capacitor and in series with a further capacitor may be connected across the signal conductors.

The invention will now be described by way of example with reference to the accompanying drawing which is a wiring diagram of a mains safety isolating device according to the invention.

The mains safety isolating device comprises a transformer T2, the primary winding $a$ of which is connected by conductors 1, 2 to an input socket I receiving a plug connected to conductors from an electro-acoustic device, such as an electric guitar or microphone, for producing electric signals. The winding $a$ is connected to ground at point E2 by conductor 2. A secondary winding $b$ of the transformer T2, of lower impedance than the primary winding $a$ is connected by signal conductors 4, 5 to the primary winding $c$ of a second transformer T1, the primary winding $c$ having an impedance matched with that of winding $b$. A secondary winding $d$, of higher impedance than winding $c$, of transformer T1 is connected by conductors 8, 9 to an output socket O receiving a plug connected to conductors of an amplifier circuit of a mains powered apparatus, the conductor 9 being connected to ground at point E1.

The grounding point E1, and E2 being separate grounding points, are effectively isolated, and in a test, no current flow between these points, showed under an applied test potential of 3,000 volts (root mean square) alternating current.

One or both of the transformers may have three windings, any further secondary winding of transformer T1, being grounded separately from winding $d$, and the respective transformer windings may be "three wire balanced" or "two wire unbalanced".

A potential divider comprising two balanced resistors R1, R2 is connected across the signal conductors 4, 5, with a centre tap connected to ground at point E1, by a conductor 6.

An interference rejection circuit comprises a resistor R3 connected in parallel with a variable capacitor C1, both in series with a further fixed capacitor C2, connected between the signal conductors 4, 5.

A housing of a mains powered apparatus including an amplifier circuit may contain the transformers T2, T1, the hum rejection circuit and the grounded balanced resistors, conductors 1 and 2 being connected by a plug to the electro-acoustic transducer. Each transformer has its higher impedance winding grounded separately from that of the other transformer in order to safeguard against simultaneous grounding failure, and to effect insulation of the circuit of the audio device.

Alternatively a guitar, microphone or other electro-acoustic transducer may be housed with the transformer T2, the signal conductors, 4, 5 being connected by plugs to the amplifier circuit of the mains powered apparatus, with which the transformer T1, and the voltage divider R1, R2 is also housed with the amplifier circuit to be grounded with the secondary winding of transformer T1. The conductive body of the electro-acoustic device is grounded at E2 independently of E1, while the housing of the mains powered apparatus is grounded at E1.

What is claimed is:

1. An audio device, comprising an electro-acoustic transducer, connected to a primary winding of a first transformer, said primary winding being also connected to ground at a first point and a secondary winding of said transformer being connected to the primary winding of a second transformer by signal conductors, a secondary winding of said second transformer being connected to an amplifier circuit of a mains powered amplifying and loud speaker apparatus, said secondary winding being connected to ground at a second point separate and electrically isolated from said first point.

2. A device according to claim 1 wherein a potential divider is connected between the signal conductors, with a center tap connected to ground.

3. A device according to claim 1, wherein the transformer cores are grounded.

4. A device according to claim 1 wherein a hum rejection circuit, comprising a resistance and variable capacitor connected in parallel to each other and in series with a further capacitor, is connected between the signal conductors.

* * * * *